UNITED STATES PATENT OFFICE.

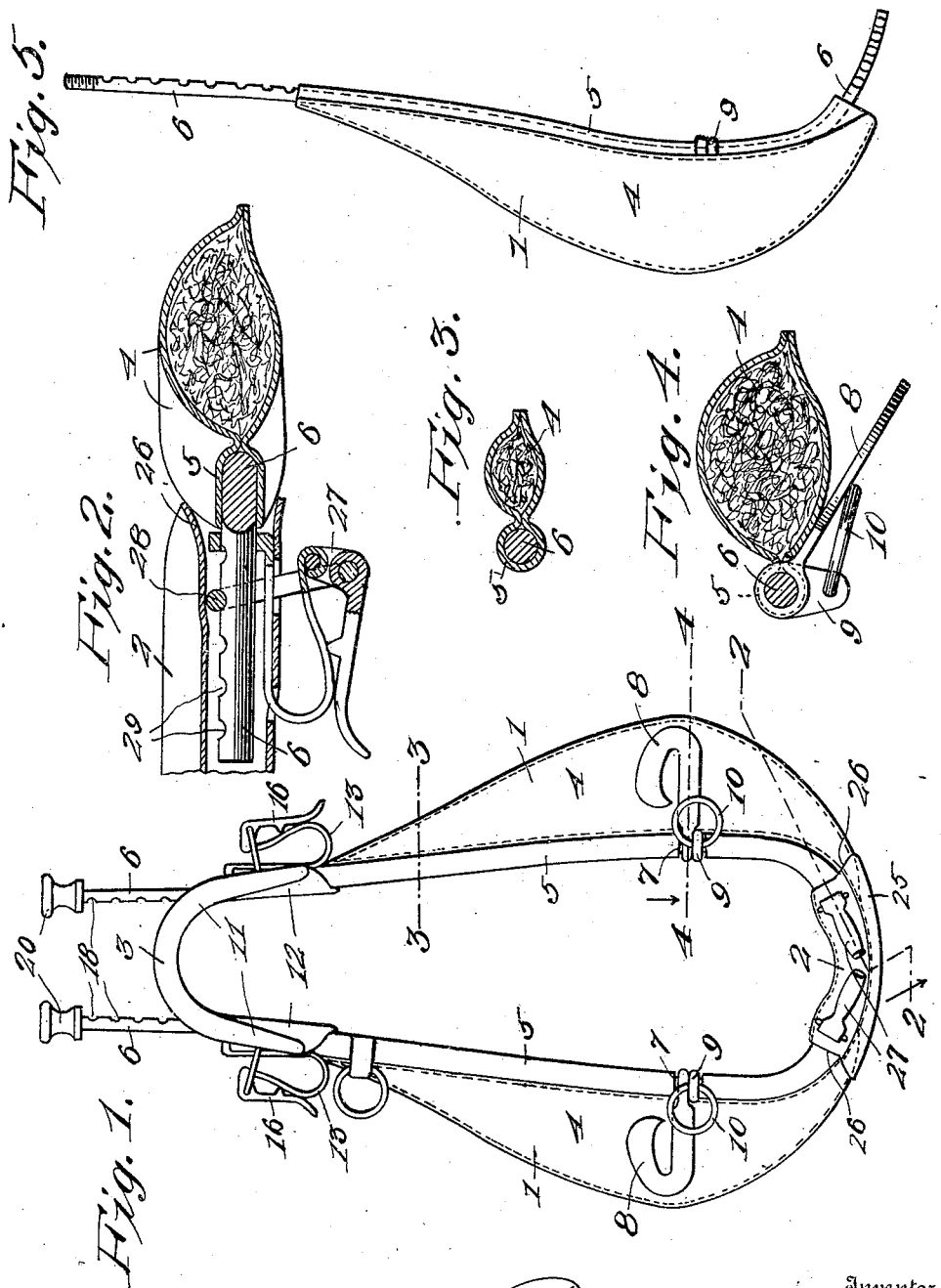

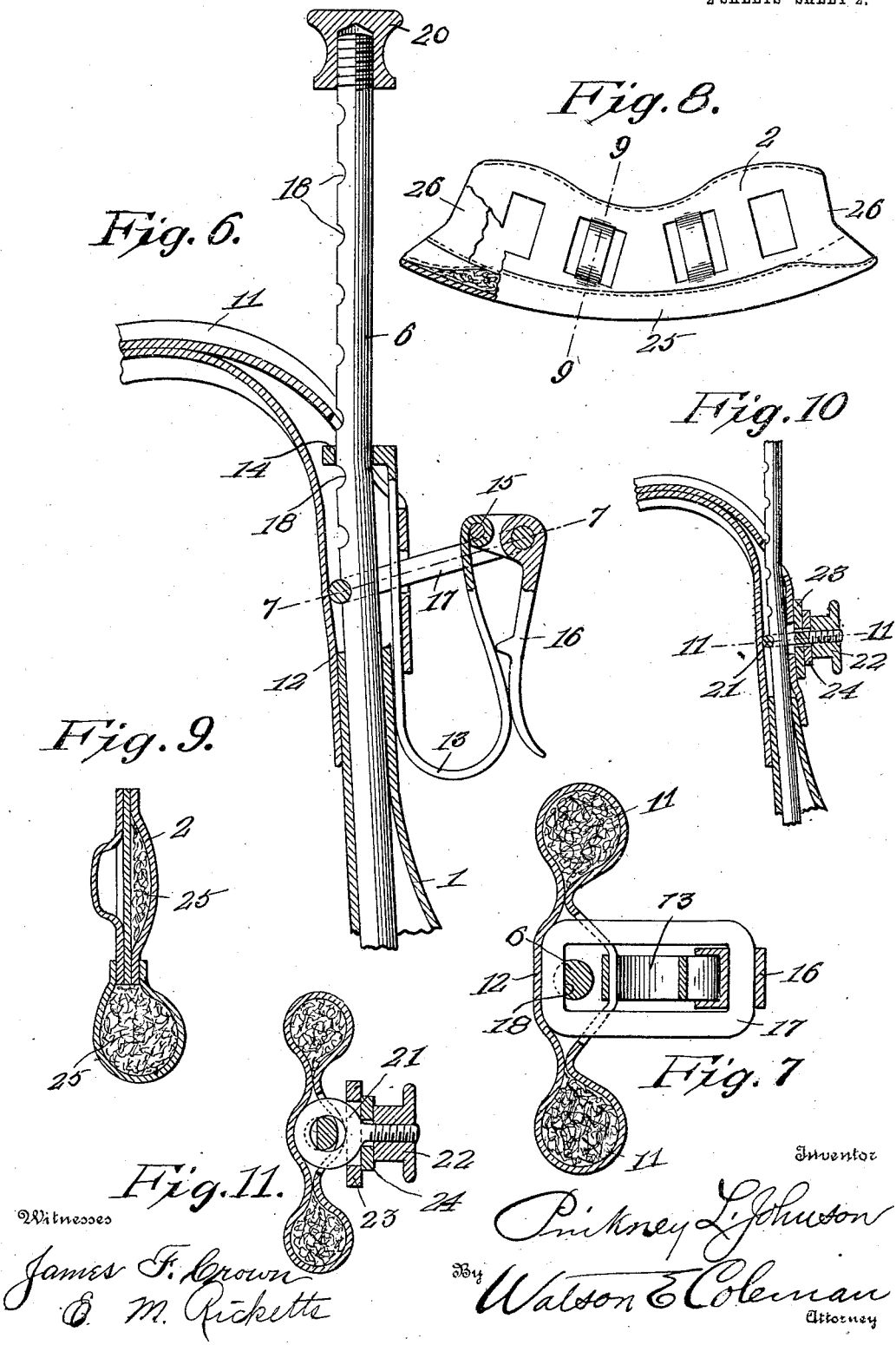

PINKNEY L. JOHNSON, OF EASLEY, SOUTH CAROLINA.

HORSE-COLLAR AND HAMES.

944,618.  Specification of Letters Patent.  Patented Dec. 28, 1909.

Application filed May 20, 1909. Serial No. 497,182.

*To all whom it may concern:*

Be it known that I, PINKNEY L. JOHNSON, a citizen of the United States, residing at Easley, in the county of Pickens and State of South Carolina, have invented certain new and useful Improvements in Horse-Collars and Hames, of which the following is a specification, reference being had to the accompanying drawings.

This invention relates to improvements in horse collars and hames.

One object of the invention is to provide an improved horse collar in which the hames will be securely fastened but may be readily detached.

Another object of the invention is to provide an improved sectional horse collar, the parts of which may be adjusted to increase either the length or the width of the collar so that the same will fit different sized animals.

With the above and other objects in view, the invention consists of the novel features of construction and the combination and arrangement of parts hereinafter fully described and claimed, and illustrated in the accompanying drawings, in which—

Figure 1 is a front elevation of my improved horse collar and hames; Figs. 2, 3 and 4 are detail sectional views taken, respectively, on the planes indicated by the lines 2—2, 3—3 and 4—4 in Fig. 1; Fig. 5 is a rear elevation of one of the side sections of the collar and one of the removable hames therein; Fig. 6 is an enlarged detail section showing one of the clamping devices for the neck piece of the collar; Fig. 7 is a detail section taken on the plane indicated by the line 7—7 in Fig. 6; Fig. 8 is a front elevation, with parts broken away and in section, of the breast piece of the collar; Fig. 9 is a detail section taken on the plane indicated by the line 9—9 in Fig. 8; Fig. 10 is a detail sectional view similar to Fig. 6, showing a different form of clamping device; and Fig. 11 is a detail section taken on the plane indicated by the line 11—11 in Fig. 10.

In the preferred embodiment of the invention illustrated in the drawings, the collar consists of two side pieces or members 1, a breast piece 2 connecting the lower ends of the same and a neck piece 3 connecting the upper ends of the same. Each of the side pieces 1 of the collar has the usual padded portion or roll 4 and a tubular portion 5 in which is removably arranged one of the two hames 6. These hames are in the form of metal rods having straight upper ends which project above the upper ends of the side pieces 1 and inwardly curved lower ends which project from the lower ends of said side pieces, as shown more clearly in Fig. 5. In the tubular portions 5 of the side pieces 1 may be formed openings 7 for the reception of suitable draft attaching devices, which latter in turn receive the removable hames 6 and are thereby held upon the collar. As illustrated, a draft hook 8 and a link 9 for a ring 10 are provided on each of the collar sections, but it will be understood that a strap with an attached buckle or any other draft connecting device may be substituted for these parts.

The neck piece 3 is substantially U-shaped, as shown in Fig. 1, and is vertically adjustable on the projecting upper ends of the hames 6. Said neck piece has front and rear padded portions or rolls 11 and tubular lower end portions 12 which receive the small upper ends of the side pieces 1 and through which the hames 6 project, as will be understood on reference to Fig. 6 of the drawings. For the purpose of adjustment, any suitable clamping means may be provided. In Fig. 6 of the drawings is shown a spring clamp consisting of a substantially U-shaped spring 13 having one end inserted in the portion 12 and provided with a laterally projecting apertured guide lug 14 to slidably receive the hames 6. The outer end of the spring 13 has pivoted upon it, as shown at 15, the short arm of an angular lever 16. The angle of this lever has pivotally arranged in it a rectangular loop or bail 17 which extends into the portion 12 of the neck piece and is adapted to enter any one of a longitudinal series of notches formed in the upper portion of the hames 6. Owing to this construction, it will be noted that the spring 13 will cause the link 17 to be seated in one of the notches or seats 18 in the hames and thereby secure the neck piece in adjusted position upon the latter. By swinging the long end or finger piece of the angular lever 16 upwardly its short end will spring downwardly to cause the pivot 15 to pass the center of the link 17, thereby relieving said link of the tension of the spring 13 so that the link can be readjusted in one of the notches 18. If desired, each of the hames 6 may have a removable cap nut 20 upon its upper end to prevent the separation of the side and neck pieces when the two clamps are in their released position.

If desired, the screw clamping device shown in Figs. 10 and 11 of the drawings may be used instead of the spring clamp just described. This screw clamping device consists of an eye bolt 21, the eye of which projects into the end 12 of the neck piece, receives the hames and is adapted to seat in one of the notches 18. On the projecting threaded end of the eye bolt 21 is a thumb nut 22, a washer 23 having a flat walled opening to receive a portion of the eye of the bolt and a second washer 24 interposed between the nut and washer 23, as shown more clearly in Fig. 11. It will be seen that when the nut 22 is loosened the eye bolt 21 may be forced inwardly and out of one of the notches 18 to permit of the adjustment of the neck piece on the hames.

The breast piece 2 has its bottom and inner face padded, as shown at 25, and its ends are tubular, as shown at 26, to receive the reduced lower ends of the side pieces 1. This breast piece is adjustably connected to the curved lower ends of the hames 6 by a clamping device such as the screw clamp shown in Figs. 10 and 11 or the spring clamp shown in Figs. 6 and 7. In Figs. 1 and 2 I have illustrated a spring clamp 27 for this purpose, said clamp having a bail or loop 28 to enter one of a longitudinal series of notches or seats 29 in the curved lower ends of the hames.

From the foregoing it will be seen that the invention provides an exceedingly simple and practical device of this character, the parts of which may be produced at a small cost and will be strong and durable in use and when worn out or broken may be readily replaced, thereby obviating the necessity of buying a complete collar.

The peculiar construction of the parts and adjustable connection permit the collar to be adapted for use on different sized horses or draft animals, the neck piece 3 permitting the height of the collar to be readily varied and the breast piece 2 permitting its width to be varied. By making the side portions of the collar with tubular portions to removably receive the hames, the collar will be strong and durable when its parts are assembled and it may be readily taken apart for repairs and cleaning.

While the preferred embodiment of the invention has been shown and described in detail, it will be understood that various changes in the form, proportion and arrangement of parts and in the details of construction may be resorted to without departing from the spirit and scope of the invention.

Having thus described the invention what is claimed is:

1. The combination of a collar having side pieces, each provided with padded portions and tubular portions, hames removably arranged in the tubular portions of the side pieces and having projecting upper and lower ends, means connecting the lower ends of the hames, a padded neck piece slidable upon the upper ends of the hames, and clamping means uniting said neck piece to the hames.

2. The combination of a collar having side pieces, each provided with padded portions and tubular portions, hames removably arranged in the tubular portions of the side pieces and having projecting upper and lower ends, means connecting the upper ends of the hames, a padded breast piece to receive the lower ends of the hames and clamping devices adjustably connecting the lower ends of the hames to said breast piece.

3. The combination of a collar having side pieces, each provided with padded portions and tubular portions, hames removably arranged in the tubular portions of the side pieces and having projecting upper and lower ends, said tubular portions of the side pieces having openings, draft devices arranged in the openings of said tubular portions and engaged with the hames and means connecting the upper and lower ends of the hames.

4. The combination of a collar having side pieces, each provided with padded portions and tubular portions, hames removably arranged in the tubular portions of the side pieces and having projecting upper and lower ends, said projecting upper and lower ends of the hames being formed with seats, a slidable neck piece on the upper ends of the hames, clamping devices carried by the neck piece and having portions to engage the seats in the upper ends of the hames, a breast piece to receive the lower ends of the hames and clamping devices upon said breast piece and having portions to enter said seats in the lower ends of the hames.

In testimony whereof I hereunto affix my signature in the presence of two witnesses.

PINKNEY L. JOHNSON.

Witnesses:
JOHN C. RAGSDALE,
J. E. FOLGER.